United States Patent
Welchko et al.

(10) Patent No.: US 7,391,181 B2
(45) Date of Patent: Jun. 24, 2008

(54) LOSS MINIMIZED PWM FOR VOLTAGE SOURCE INVERTERS TAKING INTO ACCOUNT INVERTER NON-LINEARITY

(75) Inventors: Brian Welchko, Torrance, CA (US); Steven E. Schulz, Torrance, CA (US); Silva Hiti, Redondo Beach, CA (US)

(73) Assignee: General Motors Corporation, Detroit, MI (US)

( * ) Notice: Subject to any disclaimer, the term of this patent is extended or adjusted under 35 U.S.C. 154(b) by 84 days.

(21) Appl. No.: 11/376,910

(22) Filed: Mar. 16, 2006

(65) Prior Publication Data

US 2007/0216344 A1    Sep. 20, 2007

(51) Int. Cl.
*H02P 23/00* (2006.01)
(52) U.S. Cl. .................. 318/811; 318/798; 318/807
(58) Field of Classification Search ................ 318/811
See application file for complete search history.

(56) References Cited

U.S. PATENT DOCUMENTS 6,023,417 A * 2/2000 Hava et al. ................ 363/41
6,201,720 B1 * 3/2001 Tracy et al. ................ 363/95
2005/0024902 A1 * 2/2005 Hiti et al. .................. 363/37

OTHER PUBLICATIONS

Effects and Compensation of Dead-Time and Minimum Pulse-Width Limitations in Two-Level PWM Voltage Source Inverters.
IEEE Transactions On Industrial Electronics, vol. 44, No. 2, Apr. 1997.
IEEE Transactions On Industrial Electronics, vol. 49, No. 1, Feb. 2002.
IEEE Transactions On Power Electronics, vol. 14, No. 1, Jan. 1999.

* cited by examiner

*Primary Examiner*—Lincoln Donovan
*Assistant Examiner*—Michael Brandt

(57) ABSTRACT

A dynamic pulse width modulation (PWM) selection device automatically switches between discontinuous PWM (DPWM) control methods. The PWM selection device comprises a PWM control module. The PWM control module determines a desired pulse width of a switching control signal according to a desired output signal. The PWM control module controls an actual pulse width of the switching control signal according to the desired pulse width and a first PWM control method. A selection module determines whether the desired pulse width exceeds a pulse width threshold. The selection module selects a second PWM control method when the desired pulse width exceeds the pulse width threshold.

16 Claims, 9 Drawing Sheets

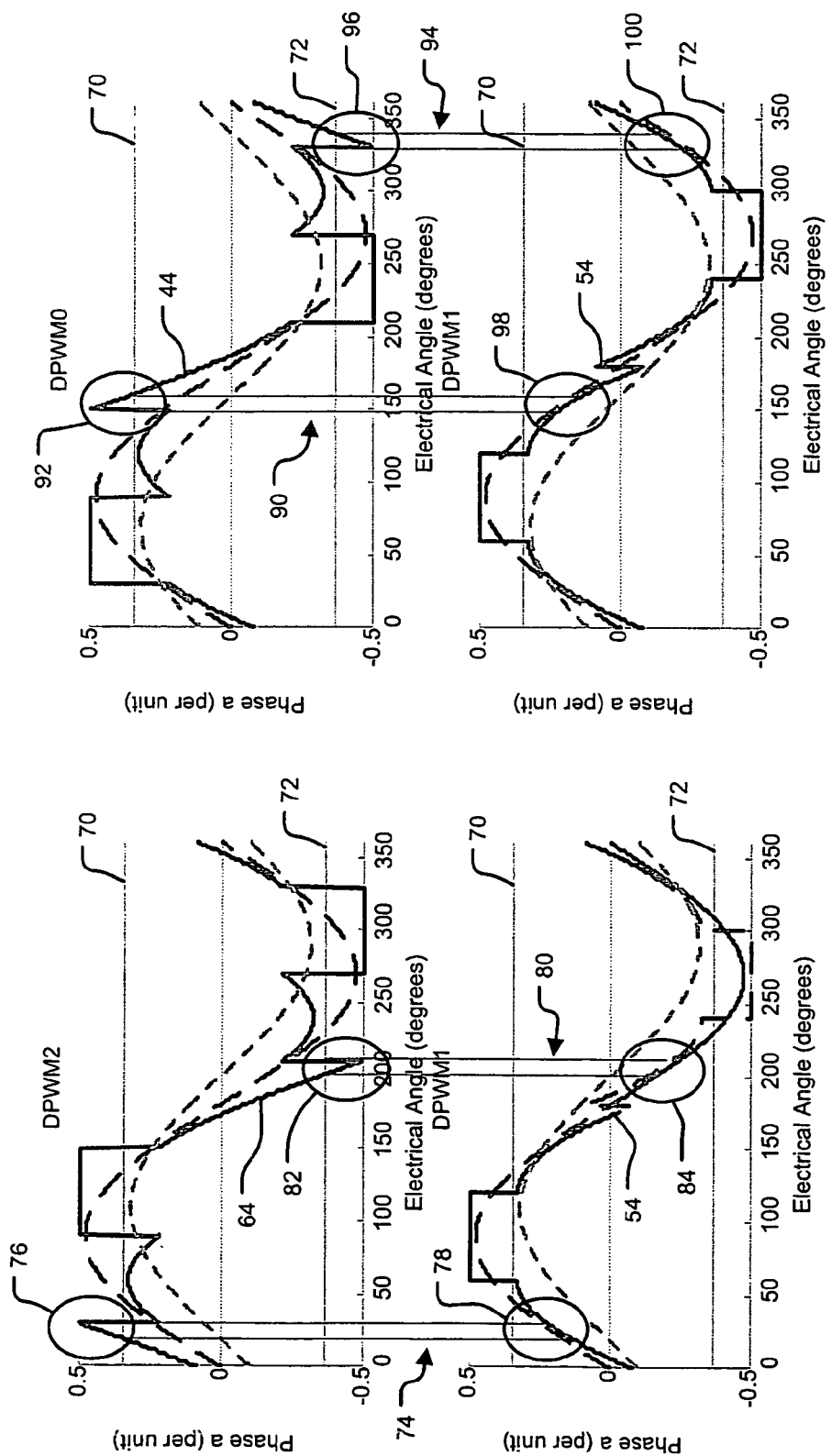
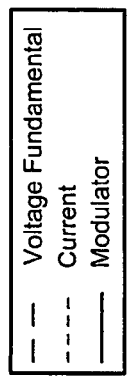
FIG. 3A
*Prior Art*
FIG. 3B
*Prior Art*

LOSS MINIMIZED PWM FOR VOLTAGE SOURCE INVERTERS TAKING INTO ACCOUNT INVERTER NON-LINEARITY

FIELD OF THE INVENTION

The present invention relates to pulse width modulation, and more particularly to selecting between pulse width modulation methods to minimize inverter losses.

BACKGROUND OF THE INVENTION

A voltage source inverter (VSI) is used to generate an AC output voltage with controllable magnitude and frequency. The VSI converts a DC voltage to the AC voltage in order to drive a three phase AC motor. Pulse width modulation (PWM) methods are used to control the operation of the VSI. A PWM control module provides high-frequency voltage pulses that control a duty cycle of one or more switches in the VSI.

Referring now to FIG. 1, an exemplary three-phase VSI 10 that drives an AC motor 12 is shown. The VSI 10 includes one or more DC voltage sources 14 and 16 and switches 18-1, 18-2, 20-1, 20-2, 22-1, and 22-2, referred to collectively as switches 24. The switches 24 are any suitable semiconductor switches as are known in the art, such as transistors including an antiparallel diode. Typically, each switch pair is operated in a complementary manner. For example, when the switch 18-1 is ON, the switch 18-2 is OFF. Conversely, when the switch 18-2 is OFF, the switch 18-1 is ON. The other switch pairs are operated in an analogous manner. The AC motor 12 is a three phase AC motor. In other words, the AC motor 12 operates according to current flow through inductor coils 26, 28, and 30. Current flows through the inductor coils 26, 28, and 30 according to the voltage sources 14 and 16 and ON and/or OFF statuses of the switches 24.

A PWM control module 32 generates one or more switching control signals 34 that control switching behavior of the switches 24. The PWM control module 32 implements a known PWM control method that operates the switches 24 to achieve desired performance characteristics of the AC motor 12. For example, PWM control methods may be continuous or discontinuous. Continuous PWM control methods, such as Sinusoidal or Space Vector modulation, cause each switch in a phase leg to cycle (i.e. turn ON and OFF) once per cycle of a carrier signal. Discontinuous PWM (DPWM) control methods cause one switch in a phase leg to remain ON or OFF continuously for a portion of a cycle of a voltage fundamental signal. A modulation signal (e.g. a switching control signal) determines a duration that the switch is ON or OFF. Typically, DPWM control methods result in lower inverter losses than continuous PWM control methods.

Three conventional DPWM methods are DPWM0, DPWM1, and DPWM2 as shown in FIGS. 2A, 2B, and 2C, respectively. Referring now to FIG. 2A, a DPWM0 waveform illustration 40 includes a voltage fundamental signal 42, a modulation signal 44, and a current signal 46 during a phase a of AC motor control. An amplitude of the modulation signal 44 is representative of a commanded duty cycle of one or more of the switches 24. In other words, the modulation signal 44 controls the duty cycle of the switches 24. Typically, the DPWM0 control method is loss optimized for lagging power factor loads. For example, the DPWM0 control method may be preferred for AC motors operating in a regeneration mode.

Referring now to FIG. 2B, a DPWM1 waveform illustration 50 includes a voltage fundamental signal 52, a modulation signal 54, and a current signal 56 during a phase a of AC motor control. The DPWM1 control method is loss optimized for unity power factor loads. For example, the DPWM1 control method may be preferred for motors operating at low speeds or with light loads.

Referring now to FIG. 2C, a DPWM2 waveform illustration 60 includes a voltage fundamental signal 62, a modulation signal 64, and a current signal 66 during a phase a of AC motor control. The DPWM2 control method is loss optimized for lagging power factor loads. For example, the DPWM2 control method may be preferred for motors in motoring action.

SUMMARY OF THE INVENTION

A pulse width modulation (PWM) selection device comprises a PWM control module. The PWM control module determines a desired pulse width of a switching control signal according to a desired output signal. The PWM control module controls an actual pulse width of the switching control signal according to the desired pulse width and a first PWM control method. A selection module determines whether the desired pulse width exceeds a pulse width threshold. The selection module selects a second PWM control method when the desired pulse width exceeds the pulse width threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3A illustrates distortion regions of a DPWM2 control method according to the prior art;

FIG. 3B illustrates distortion regions of a DPWM0 control method according to the prior art;

DETAILED DESCRIPTION OF THE PREFERRED EMBODIMENTS

Figure 1:
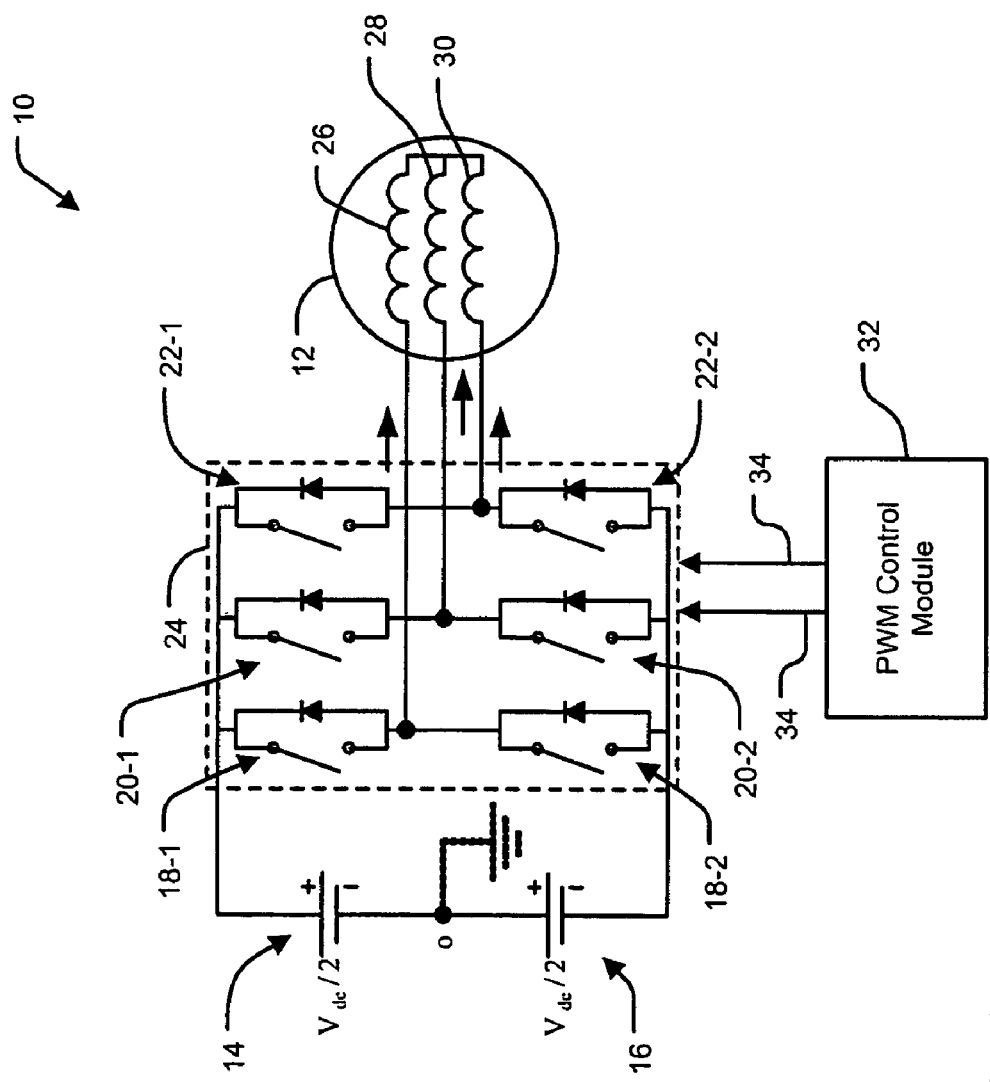
FIG. 1 is a circuit schematic of a three-phase voltage source inverter according to the prior art.
Figure 2A:
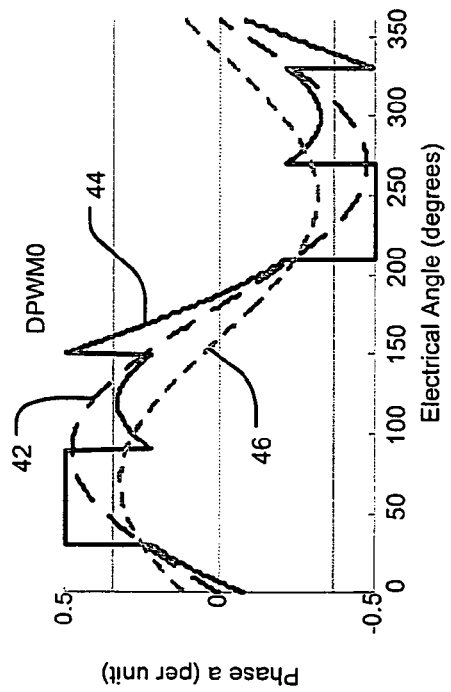
FIG. 2A illustrates operating waveforms of a DPWM0 control method according to the prior art.
Figure 2B:
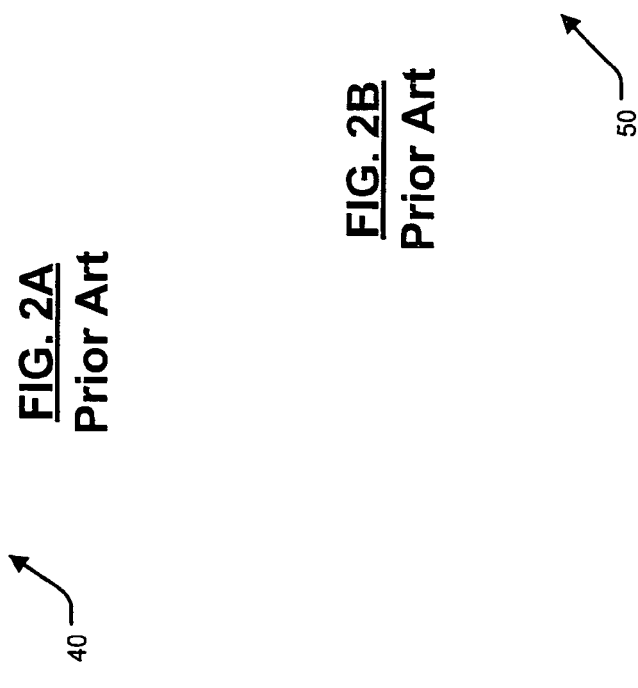
FIG. 2B illustrates operating waveforms of a DPWM1 control method according to the prior art.
Figure 2C:
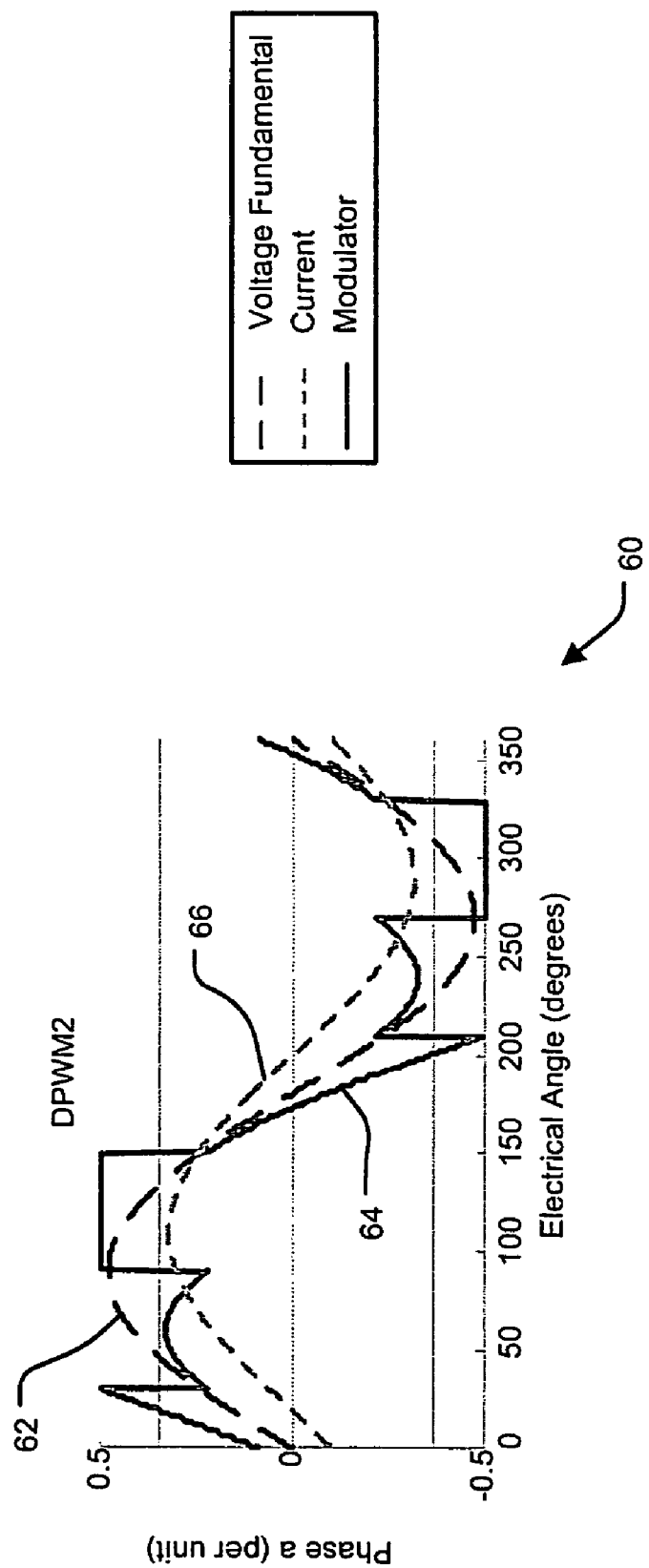
FIG. 2C illustrates operating waveforms of a DPWM2 control method according to the prior art.

The following description of the preferred embodiment(s) is merely exemplary in nature and is in no way intended to limit the invention, its application, or uses. For purposes of clarity, the same reference numbers-will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

As described above, each of the DPWM control methods DPWM0, DPWM1, and DPWM2 are optimized for particular control operations. However, the nonlinear relationship between a voltage source inverter (VSI) and an AC motor demonstrates practical control limitations of the DPWM control methods. For example, a selected DPWM control method may be unable to accurately control an output voltage of the VSI at certain amplitudes and time positions. These limitations result in distortions of the output voltage, as well as the load current, of the VSI.

In particular, the DPWM control methods control the output voltage according to a modulation signal as described in FIGS. 1, 2A, 2B, and 2C. The modulator signal controls duty cycles of one or more semiconductor switches. In other words, the controlled duty cycles are directly related to the output voltage. Control above and/or below a duty cycle threshold is inaccurate. The duty cycle corresponds to controlled pulse widths that determine ON and OFF times of the semiconductor switches. A larger duty cycle corresponds to a larger pulse width and a larger ON and/or OFF time, and a smaller duty cycle corresponds to a smaller pulse width and a smaller ON and/or OFF time. Because switch pairs operate in a complementary fashion, a duty cycle of a first switch affects a duty cycle of a second switch. In this manner, when a pulse width for the first switch is large, a pulse width for the second switch is small.

Pulse widths below a pulse width threshold (e.g. a pulse width that corresponds to a 5% duty cycle) are difficult to achieve. For example, limitations in circuitry components, such as the semiconductor switches, may prevent accurate pulse width control below the pulse with threshold. Distortions occur when a desired duty cycle is large enough or small enough that a controlled pulse width is below the pulse width threshold.

Typically, the electrical angles at which the control limitations occur vary for each DPWM control method. FIGS. 3A and 3B illustrate exemplary distortion regions for the DPWM0, DPWM1, and DPWM2 control methods. Referring now to FIG. 3A, distortion regions for the DPWM2 control method and the DPWM1 control method occur at different electrical angles. A maximum pulse width limit 70 and a minimum pulse width limit 72 indicate maximum and minimum pulse width thresholds, respectively. When a desired duty cycle requires a pulse width for a first switch that is greater than the maximum pulse width limit 70, it can be understood that a pulse width for the second (complementary) switch is less than the minimum pulse width limit 72. In other words, desired pulse widths above the maximum pulse width limit 70 inherently result in a desired pulse width below the minimum pulse width limit 72 in a complementary switch.

The DPWM2 modulation signal 64 commands a pulse width that exceeds the maximum pulse width limit 70 in an electrical angle range 74. As a result, a distortion region 76 occurs in the electrical angle range 74 during DPWM2 control. The DPWM1 modulation signal 54 commands a pulse width that does not exceed the maximum pulse width limit 70 in the electrical angle range 74. In other words, the DPWM1 modulation signal 54 is in a region 78 in the electrical angle range 74. Similarly, the DPWM2 modulation signal 64 commands a pulse width that exceeds the minimum pulse width limit 72 in an electrical angle range 80. A distortion region 82 occurs in the electrical angle range 80 during DPWM2 control. The DPWM1 modulation signal 54 commands a pulse width that does not exceed the minimum pulse width limit 72 in the electrical angle range 80. The DPWM1 modulation signal 54 is in a region 84 in the electrical angle range 80.

Referring now to FIG. 3B, distortion regions for the DPWM0 control method and the DPWM1 control method occur at different electrical angles. The DPWM0 modulation signal 44 commands a pulse width that exceeds the maximum pulse width limit 70 in an electrical angle range 90, resulting in a distortion region 92. The DPWM0 modulation signal 44 commands a pulse width that exceeds the minimum pulse width limit 72 in an electrical angle range 94, resulting in a distortion region 96. The DPWM1 modulation signal 54 commands pulse widths according to regions 98 and 100 in the electrical angle ranges 90 and 94, respectively.

As described in FIGS. 3A and 3B, it can be understood that each of the DPWM control methods demonstrates control limitations at various electrical angles. The present invention implements a control method that dynamically switches between DPWM control methods to minimize inverter losses. The invention selectably avoids DPWM control methods that result in commanded output voltage distortions in particular electrical angle ranges.

Another cause of DPWM control limitations is inverter dead-time. A PWM control module inserts a period (i.e. the inverter dead-time) between transitions of a complementary switch pair to avoid a shoot-through condition. A shoot-through condition occurs when both switches in a switch pair are ON simultaneously. During the inverter dead-time, a polarity of a current flowing through inverter anti-parallel diodes determines the VSI output voltage. The inverter dead-time manifests as a virtual resistance and effectively increase the minimum pulse width. In other words, during the inverter-dead time, the minimum pulse width limit 72 increases, resulting in larger distortion regions.

As described previously, each of the DPWM control methods is optimized according to a power factor of the load of the VSI. The power factor of the load may also contribute to distortions and control limitations when a DPWM control method that is not optimized for a particular load type is used.

Figure 4:
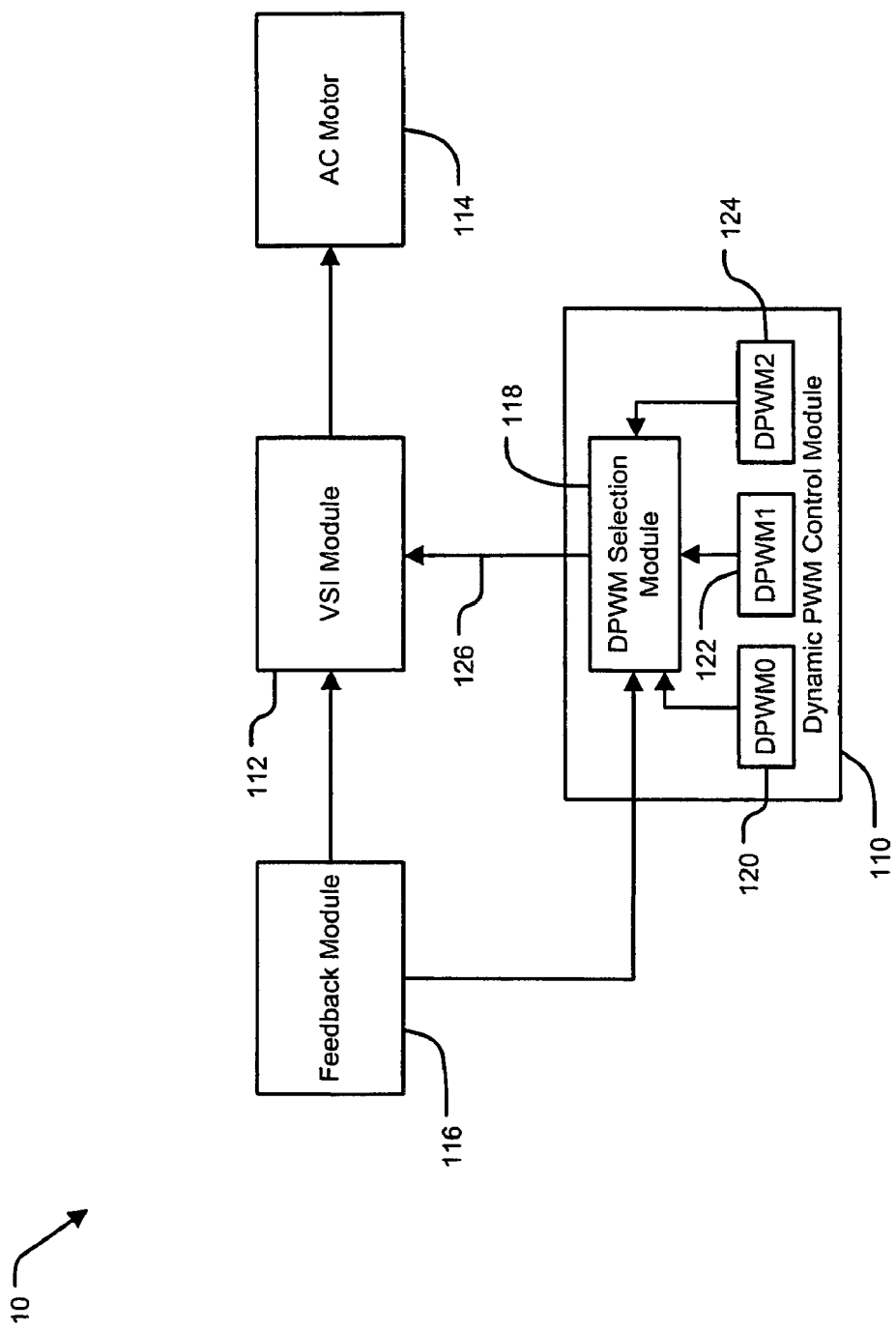
FIG. 4 is a functional block diagram of a voltage source inverter that includes a dynamic pulse width modulation (PWM) control module according to the present invention.

Referring now to FIG. 4, a three-phase VSI 10 as described in FIG. 1 includes a dynamic PWM control module 110 according to the present invention, a VSI module 112, a load such as an AC motor 114, and a feedback module 116. The dynamic PWM control module 110 includes a DPWM selection module 118. The selection module 118 selects a DPWM control method, such as DPWM0, DPWM1, DPWM2, or another suitable DPWM control method as described below. The PWM module 110 operates according to the selected DPWM control method. For example, the PWM control module 110 may include a DPWM0 control module 120, a DPWM1 control module 122, and a DPWM2 control module 124. The selection module 118 outputs a modulation signal 126 according to the selected DPWM control method. Alternatively, the DPWM control modules may be integrated with the selection module 118.

Figure 5:
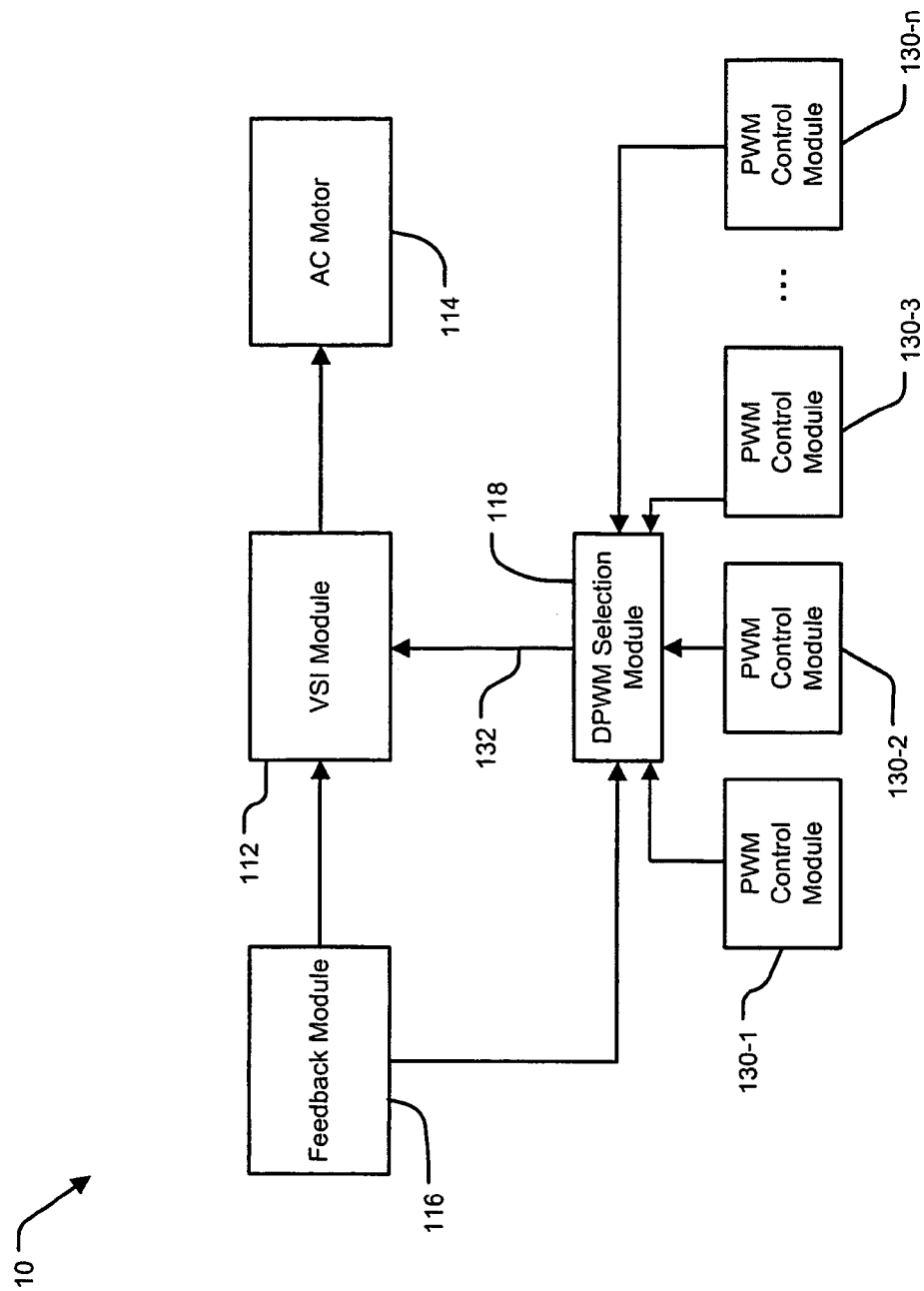
FIG. 5 is a functional block diagram of a voltage source inverter that includes a dynamic PWM control module according to a second implementation of the present invention.

In another implementation, the VSI 10 may include multiple PWM control modules 130-1, 130-2, 130-3, . . . , and 130-n, referred to collectively as PWM control modules 130, as shown in FIG. 5. The PWM control modules 130-1, 130-2, and 130-3 operate according to DPWM0, DPWM1, and DPWM2, respectively. The PWM control module 130-n operates to any other suitable PWM control method. The selection module 118 selects and outputs a modulation signal 132 according to a modulation signal of a selected PWM control module.

Referring to FIGS. 4 and 5, the selection module 118 selects a DPWM control method according to a commanded output voltage (i.e. a voltage amplitude) and distortion regions of all available DPWM control methods. The selection module 118 determines whether the commanded voltage amplitude and/or electrical angle is in a distortion region of the currently active DPWM control method. For example, the selection module 118 communicates with the feedback module 116. The feedback module 116 determines output current and/or voltage of the VSI module 112. The selection module 118 determines (i.e. calculates and/or estimates) the distortion region based in part on data received from the feedback module. For example, the selection module 118 determines a modulation index, an electrical angle θ, and/or a power factor of the load. When the commanded voltage enters the distortion region, the selection module 118 selects an alternate DPWM control method. In other words, the selection module 118 selects a DPWM control method that is not in a distortion region at a current modulation index, electrical angle and/or load power factor.

Figure 6:
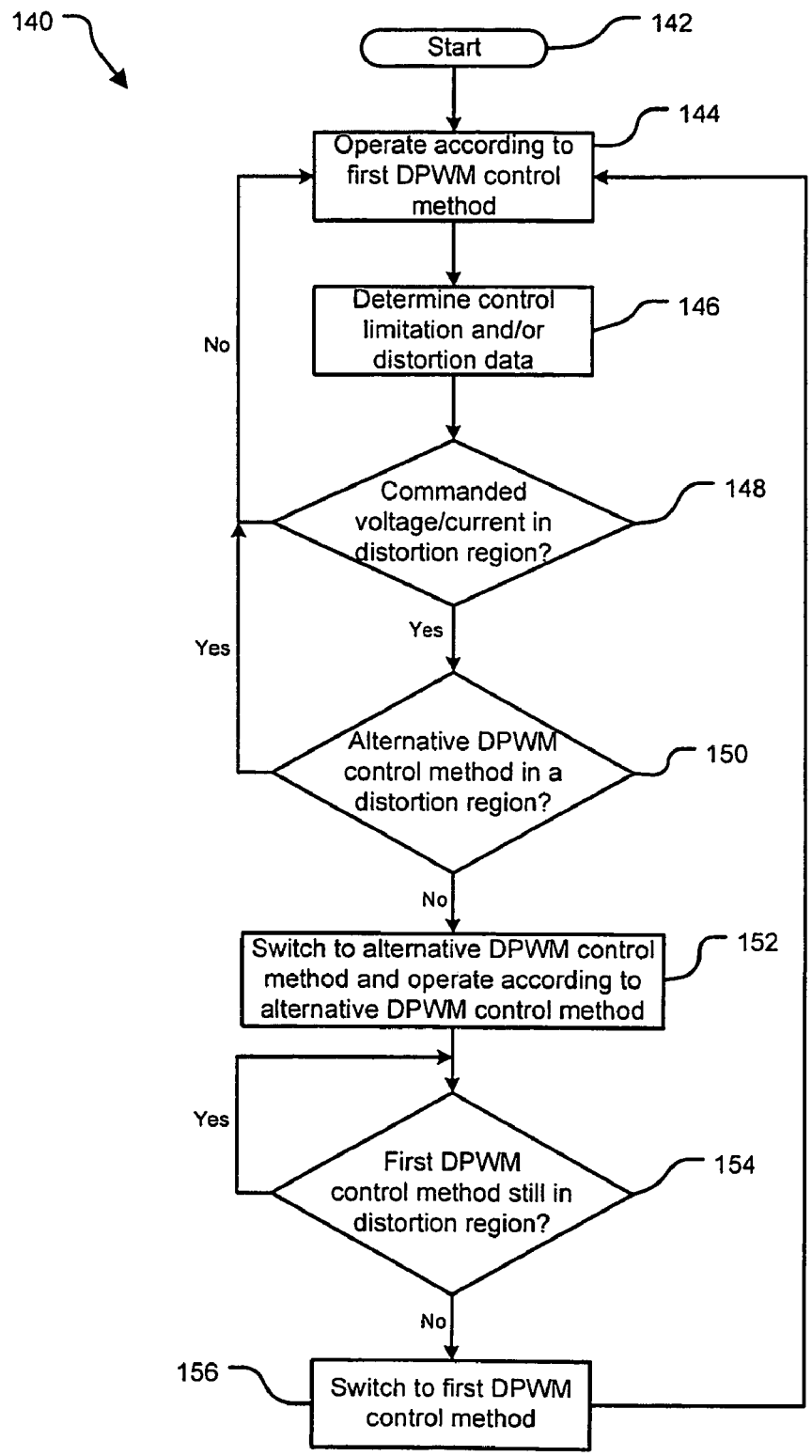
FIG. 6 is a flow diagram that illustrates steps of a DPWM control method according to the present invention.

Referring now to FIG. 6, the selection module 118 implements an exemplary DPWM selection method 140. The method 140 begins in step 142. In step 144, a PWM control module operates according to a first DPWM control method. In step 146, the method 140 determines data relevant to control limitations and/or distortion as described above. For example, the method 140 determines modulation index, output voltage/current (actual and/or desired), an electrical angle, and a load power factor. In step 148, the method 140 determines whether a commanded voltage/current is in a distortion region of the first DPWM control method. If true, the method 140 continues to step 150. If false, the method 140 continues to step 144.

In step 150, the method 140 determines whether an alternative DPWM control method would operate in a distortion region according to the current performance data (i.e. commanded voltage/current). If true, the method 140 continues to step 144. If false, the method 140 continues to step 152. In step 152, the method 140 switches to the alternative DPWM control method. In a preferred implementation of the present invention, the method 140 switches from DPWM0 and/or DPWM2 to DPWM1. As described in FIGS. 3A and 3B, when the modulation signals of DPWM2 and DPWM0 are in distortion regions, the modulation signal of DPWM1 is not in a distortion region.

In step 154, the method 140 determines whether the first DPWM control method would still be operating in a distortion region. If true, the method 140 continues to step 154. If false, the method 140 continues to step 156. In step 156, the method 140 switches to the first DPWM control method. The method 140 continues to step 144. In this manner, the method 140 temporarily switches to an alternative DPWM control method when the first DPWM control method is operating in a distortion region. Alternatively, the method 140 may continue to operate according to the alternative DPWM control method until the alternative DPWM control method operates in a distortion region.

Figure 7B:
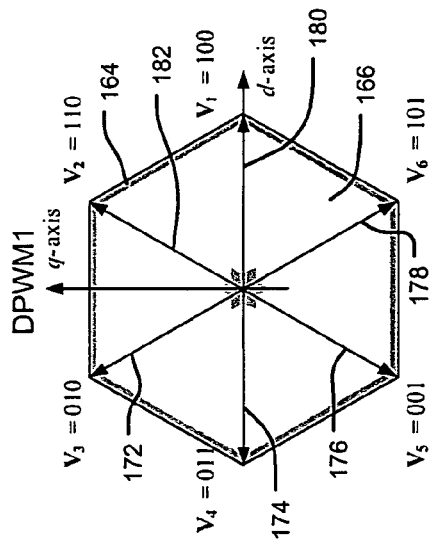
FIG. 7B illustrates distortion regions of a DPWM1 control method in space vector format according to the present invention.
Figure 7C:
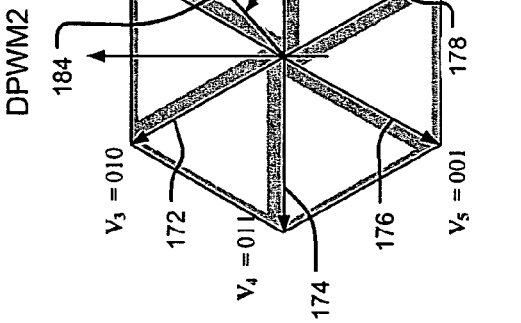
FIG. 7C illustrates distortion regions of a DPWM2 control method in space vector format according to the present invention.
Figure 7A:
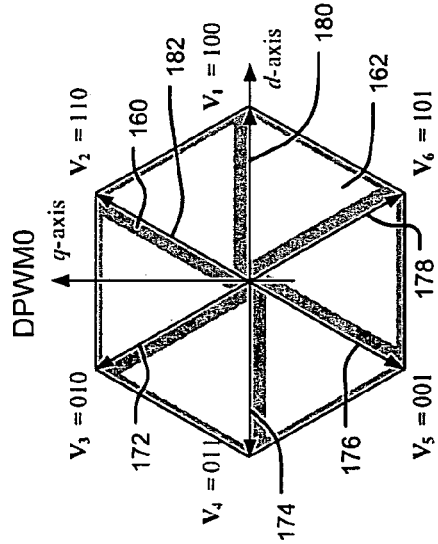
FIG. 7A illustrates distortion regions of a DPWM0 control method in space vector format according to the present invention.

Distortion regions for DPWM0, DPWM1, and DPWM2 are shown as plotted in space vector format in FIGS. 7A, 7B, and 7C, respectively. Referring now to FIG. 7A, shaded (distortion) regions 160 indicate distortion regions resulting from pulse width limitations and inverter dead-time as described above. Regions 162 correspond to pulse widths within the control limitations of the DPWM0 control method. Referring now to FIG. 7B, shaded regions 164 indicate distortion regions of the DPWM1 control method and regions 166 correspond to pulse widths within the control limitations of the DPWM1 control method. Shaded regions 168 indicate distortion regions of the DPWM2 control method and regions 170 correspond to pulse widths within the control limitations of the DPWM2 control method. The distortion regions 160, 164, and 168 can be determined according to known pulse width and inverter dead-time constraints of each DPWM control method.

Figure 8:
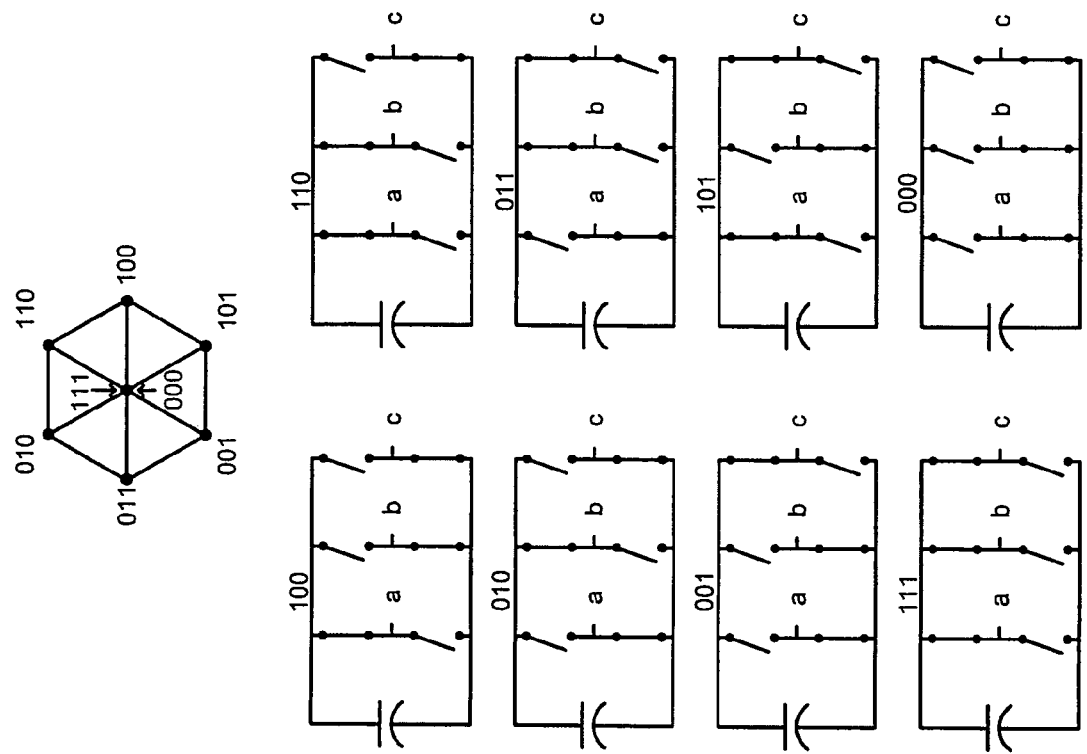
FIG. 8 illustrates switch positions of complementary switch pairs according to the prior art.

Voltage vectors 172, 174, 176, 178, 180, and 182 correspond to switch positions of complementary switch pairs in a VSI circuit. For example, the voltage vector 172 indicates a binary switch status of 010. Each position in the binary switch status refers to the switch positions of a switch pair. A "0" indicates that a first (i.e. top) switch in the switch pair is open and a second (i.e. bottom) switch in the switch pair is closed. Conversely, a "1" indicates that the first switch is closed and the second switch is open. FIG. 8 is an exemplary switch status diagram that illustrates binary switch statuses and corresponding switch positions. Phase legs are indicated at a, b, and c.

Referring again to FIGS. 7A, 7B, and 7C, the voltage vectors correspond to a commanded output voltage of the VSI. An exemplary commanded voltage vector 184 is shown in FIG. 7C. A length of the voltage vector 184 corresponds to an amplitude of the commanded output voltage. An angle θ corresponds to an instantaneous angle of the output voltage. As described above in FIGS. 3-6, the DPWM selection method of the present invention determines when a current DPWM control method is operating in a distortion region according to the commanded output voltage and angle as described in FIGS. 7 and 8. In this manner, the DPWM selection method selects an alternative DPWM control method that is not operating in a distortion region.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A pulse width modulation (PWM) selection device comprising:
   a PWM control module that determines a desired pulse width of a switching control signal according to a desired output signal, and that controls an actual pulse width of the switching control signal according to the desired pulse width and a first PWM control method;
   a selection module that determines whether the desired pulse width exceeds a pulse width threshold, and that selects a second PWM control method when the desired pulse width exceeds the pulse width threshold.

2. The PWM selection device of claim 1 wherein the PWM control module is a discontinuous PWM (DPWM) control module.

3. The PWM selection device of claim 2 wherein the PWM control module is operable to control the actual pulse width according to at least one of a DPWM0, a DPWM1, and a DPWM2 control method.

4. The PWM selection device of claim 1 wherein the desired output signal is at least one of a desired output voltage and a desired output current.

5. The PWM selection device of claim 4 wherein the selection module determines whether the desired pulse width exceeds the pulse width threshold according to at least one of the desired output voltage, the desired output current, an electrical angle of the desired output signal, a power factor of a load associated with the PWM selection device, and a modulation index.

6. The PWM selection device of claim 1 wherein the selection module determines that the desired pulse width exceeds the pulse width threshold when the desired pulse width is at least one of greater than a maximum pulse width threshold and less than a minimum pulse width threshold.

7. A voltage source inverter (VSI) that comprises the PWM selection device of claim 1.

8. The VSI of claim 7 wherein the VSI provides current to an AC motor.

9. A pulse width modulation (PWM) selection device comprising:
- a first PWM control module that determines a first desired pulse width of a first switching control signal according to a desired output signal, and that controls an actual pulse width of the first switching control signal according to the desired pulse width and a first PWM control method;
- a second PWM control module that determines a second desired pulse width of a second switching control signal according to the desired output signal, and that controls an actual pulse width of the second switching control signal according to the second desired pulse width and a second PWM control method;
- a selection module that receives the first switching control signal and the second switching control signal, that determines whether the first desired pulse width exceeds a pulse width threshold, that outputs the first switching control signal when the first desired pulse width does not exceed the pulse width threshold, and that outputs the second switching control signal when the first desired pulse width exceeds the pulse width threshold.

10. The PWM selection device of claim 9 wherein at least one of the first PWM control method and the second PWM control method is a discontinuous PWM (DPWM) control method.

11. The PWM selection device of claim 10 wherein the DPWM control method is at least one of a DPWM0, a DPWM1, and a DPWM2 control method.

12. The PWM selection device of claim 9 wherein the desired output signal is at least one of a desired output voltage and a desired output current.

13. The PWM selection device of claim 12 wherein the selection module determines whether the first desired pulse width exceeds the pulse width threshold according to at least one of the desired output voltage, the desired output current, an electrical angle of the desired output signal, a power factor of a load associated with the PWM selection device, and a modulation index.

14. The PWM selection device of claim 9 wherein the selection module determines that the first desired pulse width exceeds the pulse width threshold when the first desired pulse width is at least one of greater than a maximum pulse width threshold and less than a minimum pulse width threshold.

15. A voltage source inverter (VSI) that comprises the PWM selection device of claim 9.

16. The VSI of claim 15 wherein the VSI provides current to an AC motor.

* * * * *